（12） United States Patent
Ferro et al.

(10) Patent No.: US 10,671,043 B2
(45) Date of Patent: Jun. 2, 2020

(54) SYSTEM AND METHOD FOR GENERATING A VISUALIZATION OF A BUILDING MANAGEMENT SYSTEM

(71) Applicant: ABB AG, Mannheim (DE)

(72) Inventors: Eric Ferro, Castelmeurou (FR); Francois Mayis, Colomiers (FR); Olaf Bigalke, Iserlohn (DE)

(73) Assignee: ABB AG, Mannheim (DE)

( * ) Notice: Subject to any disclaimer, the term of this patent is extended or adjusted under 35 U.S.C. 154(b) by 88 days.

(21) Appl. No.: 15/784,213

(22) Filed: Oct. 16, 2017

(65) Prior Publication Data

US 2018/0039246 A1 Feb. 8, 2018

Related U.S. Application Data

(63) Continuation of application No. PCT/EP2016/054659, filed on Mar. 4, 2016.

(30) Foreign Application Priority Data

Apr. 16, 2015 (EP) ..................................... 15001104
Jul. 9, 2015 (EP) ..................................... 15002051

(51) Int. Cl.
*G05B 19/048* (2006.01)
*G06F 16/958* (2019.01)
*G06F 17/24* (2006.01)

(52) U.S. Cl.
CPC .. G05B 19/048 (2013.01); *G05B 2219/23258* (2013.01); *G05B 2219/2642* (2013.01)

(58) Field of Classification Search
CPC ............... G06F 16/958; G06F 16/9577; G06F 17/5004; G06F 17/212; G06F 17/248; E04B 2001/34892

(Continued)

(56) References Cited

U.S. PATENT DOCUMENTS

2005/0275525 A1 12/2005 Ahmed
2005/0289467 A1* 12/2005 Imhof .................... G05B 15/02
715/734

(Continued)

FOREIGN PATENT DOCUMENTS

EP 2302470 A2 3/2011

*Primary Examiner* — Michael J Brown
(74) *Attorney, Agent, or Firm* — Leydig, Voit & Mayer, Ltd.

(57) ABSTRACT

In an embodiment, the present invention provides a system for generating a visualization a home or building, including a fieldbus commissioning tool with a template library and a graphical commissioning engine for implementing physical devices of the home or building. The template library includes: a set of device templates and device object templates, which contains information how the devices are used; a set of zone templates, which specify the use of the devices which are available within a zone; a set of automation templates and a set of web templates. The fieldbus commissioning tool is connected with a configuration data input unit and an automation studio, the automation studio being receiving building topology information, which are supplied by the fieldbus commissioning tool. Based on the building topology, the automation studio generates a navigation structure of the building to allow access to different areas of the building.

12 Claims, 1 Drawing Sheet

(58) Field of Classification Search
USPC .......................................................... 700/275
See application file for complete search history.

(56) References Cited

U.S. PATENT DOCUMENTS

| | | | |
|---|---|---|---|
| 2007/0143451 A1* | 6/2007 | Huth | G05B 19/042 |
| | | | 709/220 |
| 2012/0066178 A1 | 3/2012 | Kanner et al. | |
| 2015/0278402 A1* | 10/2015 | Hsieh | G06F 17/5004 |
| | | | 703/1 |

* cited by examiner

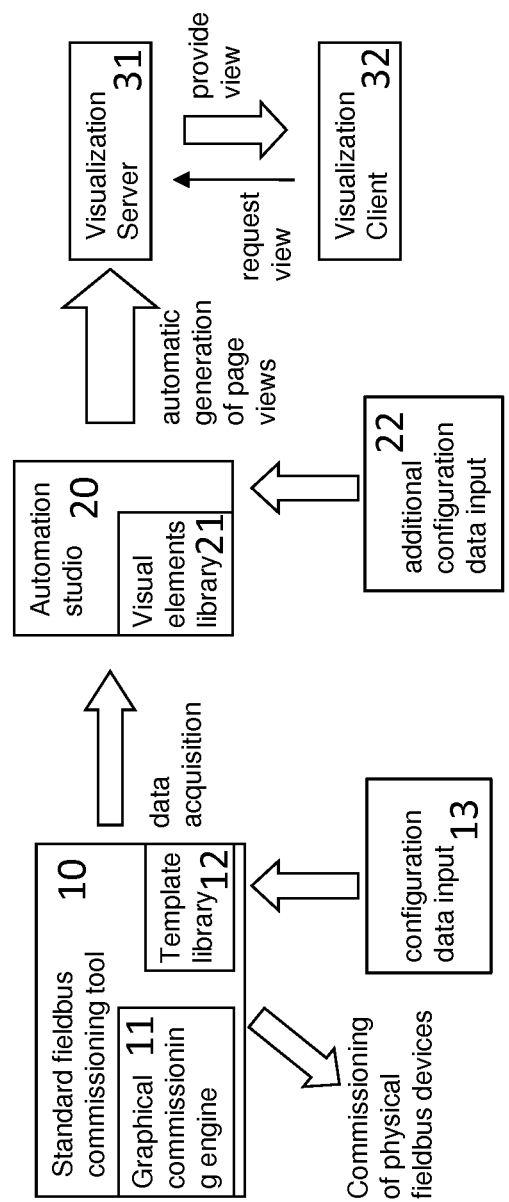

ial Patent
SYSTEM AND METHOD FOR GENERATING A VISUALIZATION OF A BUILDING MANAGEMENT SYSTEM

CROSS-REFERENCE TO PRIOR APPLICATION

This application is a continuation of International Patent Application No. PCT/EP2016/054659, filed on Mar. 4, 2016, which claims priority to European Patent Application No. 15001104.7, filed on Apr. 16, 2015, and European Patent Application No. 15002051.9, filed on Jul. 9, 2015. The entire disclosure of each of these applications is hereby incorporated by reference herein.

FIELD

The invention relates to a system and a web-based method for generating a home or a building visualization for a building management system or building automation system and a user for the visualization of the automation in a building, as a building management system or building automation system.

BACKGROUND

A building management system is used to control and monitor a building or a part of a building, e.g. in functional buildings, hotels, office buildings, hospitals, apartment buildings etc.

The implementing or commissioning of a functional building or part of building, e.g. a hotel, an office-building complex, a hospital or a cinema follows normally a two-step approach.

In a first implementation step, all physical devices, e.g. fieldbus devices, have to be configured with dedicated application parameters and data points for establishing communication to the bus system, which connects the devices of the building automation system. Depending on the underlying technologies, different tools have to be used to execute this implementing step.

The application parameters generally called configuration properties in a local operating network (LON) and parameters in KNX-standard. These are settings that are mainly kept in the persistent memory of devices. They are used to configure the way of working of a device, for instance of working for lights (dimming mode or on/off mode), fan coil device state as standalone, master, slave etc.

Data points generally called network variables in LON and group address in KNX. These are the values for instance will allow changing the temperature offset for a fan coil unit, e.g. a data point used to configure the temperature set point of a fan coil.

In a second implementation step, the visualization of the building has to be setup. Additional commissioning tools and releases are required, which exchange basic data functionalities with the tools the first step.

While in the first step all fieldbus devices have to be placed to their location inside the building, the second step requires the positioning of control elements inside a visual building topology. Currently both steps require manual work and are isolated and independent from each other. Import and export functions are provided to use the data exchange between the different commissioning tools, however during these steps information gets lost and has to be added once again.

SUMMARY

In an embodiment, the present invention provides a system for generating a visualization a home or building, comprising: a fieldbus commissioning tool with a template library and a graphical commissioning engine configured to implement physical devices of the home or building, wherein the template library includes: a set of device templates and device object templates, which contains information how the devices are used; a set of zone templates, which specify the use of the devices which are available within a zone; a set of automation templates and a set of web templates, wherein the fieldbus commissioning tool connected with a configuration data input unit and an automation studio, the automation studio being configured to receive building topology information, which are supplied by the fieldbus commissioning tool, wherein, based on the building topology, the automation studio is configured to generate a navigation structure of the building to allow access to different areas of the building and to generate automatically web pages with a view of the building visualization using the web templates, and wherein the automation studio is connected with a visualization server configured to transfer the web pages to the visualization server, and the web pages are provided to or accessible for a client device.

BRIEF DESCRIPTION OF THE DRAWINGS

The present invention will be described in even greater detail below based on the exemplary FIGURES. The invention is not limited to the exemplary embodiments. Other features and advantages of various embodiments of the present invention will become apparent by reading the following detailed description with reference to the attached drawings which illustrate the following:

FIG. 1 shows an exemplary embodiment of the innovative system for generating a building or a home visualization based on at least one user interface for a building management system or building automation system, wherein the user interface is provided to input configuration data.

DETAILED DESCRIPTION

Thus, the invention relates to a system and a web-based method for generating a building or a home visualization to integrate automatically or semi-automatically information of the entire building, automation and to control heating, cooling systems, ventilation and air conditioning, systems, lighting, sun-shading systems, fire protection and/or security systems in the building visualization. The new system and method are provided to offer simple and efficient possibilities for generating a building visualization.

The generation of the building or home visualization uses a user interface, e.g. a Human-Machine Interface (HMI) for a building management system or building automation system and is integrated into a graphical engineering workflow.

The data processing of the configuration data, the data transfer to the automation studio, to a visualization server and/or to a client device done by internet connections. In addition, the transfer of the generated pages can use internet connections.

According to a first aspect, the invention refers to a system to generate a building visualization. The innovative system comprises a fieldbus commissioning tool with a template library and a graphical commissioning engine to implement physical devices of a building.

The devices represent equipment connected e.g. to the fieldbus, a device is then composed of device objects. The device objects are the different item of the device. For example a device for lighting can be composed of several device objects, which each object representing individually a lamp or a push-button or a remote control etc.

The graphical commissioning engine localizes devices and their device objects, the use of the devices, device object and zones on a graphical building map and generates automatically a huge amount of information needed for the further implementation of a building visualization e.g. in at least one user interface, e.g. a Human-Machine Interface (HMI) for a building management system or building automation system.

Based on the definition of the fieldbus template library, device templates, device object templates and zone templates with fieldbus information are used to configure and connect device objects together.

Equipment containing device (e.g. lights, fan coils, blinds, which are provided in the building) and device objects are placed on floor plans, then rooms are drawn to embed the equipment; from there the commissioning tool configures and connects automatically the device objects that are in the same room according to the definition of previously defined templates.

The invention gives ability to override the fieldbus template library with new information as automation template and web template.

The commissioning tool is provided to define device templates, device object templates and a zone templates library. The zone templates library is a library can therefore be reused later on other project from commissioning tool.

The device templates contain information how the devices are used and define different types of devices (e.g. lights, fan coils, blinds), which are provided in the building (e.g. a light device model 1 from company 1, a light device model 2 from company 2 . . . , a fan coil device model 1 from company 3 etc. . . . ).

The device object templates contain information how the device objects are used and define the different object type within a device template, that is to say:
different device objects that compose the device (e.g: 8 lamps, 4 remote controls, . . . )
their application parameters with their values
their data points commonly used in the building management system.

The zone templates specify specific application parameter value to device object and how device object are connected together within a zone. For example, the zone contains devices, which are part of a room or a group of rooms concerned e.g. the entire building, automation and to control heating, cooling systems, ventilation and air conditioning, systems, lighting, sun-shading systems, fire protection and/or safety systems.

The defined zone templates includes information on how the devices objects are connected together (e.g. when the zone templates are in a room—to make push buttons light on the lights). At this level it is possible to override any of the previously defined application parameter to have specific value written on specific conditions, (e.g. a device object is master object in the zone, a device object is standalone in the zone)

It is also provided to define the data points that will be available in the building management system for monitoring for this template of zone.

An example to create a zone template data point is described below:
On an open space room the temperature is given by the fan coil master, in the template it is defended that a public point is zone temperature, and it is represented by the corresponding data points on the master fan coil device.

Once the templates has been defined the instances of the devices and of the devices objects are placed on the floor plan. The zones are then drawn and embed the instances of the device objects inside, so at the end, the commissioning tool put altogether so that he can write the correct application parameters to configure the devices and makes the correct connection to make them communicate together.

Then over this fieldbus template, it is possible to define an automation template. This means for each data points defined in the device/device object/zone template. It is possible to configure e.g. an alarm, a trend or a scheduler on it.

Since this is defined at "template level", the definition will be applied for each instance of device/device object/zone so this will generate from the first configuration as many real alarm or trend than the number of device instance in the building.

The visualization always has a generic page for all alarms, trends and/or schedulers that are generated from the automation template. So all these automation information can always be accessed from a dedicated page from the visualization.

The visualization template provides a way to define how devices, device objects and zones defined in the template library is handled by the visualization.

It is for example possible to define at template level:
How device and device object are represented on the floor plan (example: lamps must be blue when ON, white when OFF)
How the zones are represented on the floor plan (example: green when not occupied, etc.).
What is the detailed information related to zones (thumbnails, detail views, remote controls, alarms, trends, schedulers, etc.).

A compilation of building information done at commissioning level with information of device template, device object template, zone template, automation template and web templates will generate automatically the visualization web site.

The generation of the building visualization uses visualization templates to display an alarm management, a scheduling management and/or a trend/historian management.

The fieldbus commissioning tool is connected with a configuration data input unit and an automation studio. The automation studio receives building topology information created by the fieldbus commissioning tool. Building topology information is information concerning zones, control components, devices, networks, areas, spaces, equipment and/or their usage or functionalities (e.g. a light can work in dimming mode or on/off mode, a fan coil can work in standalone mode or master/slave mode), using in a building management system or building automation system.

The building topology information is supplied by the fieldbus commissioning tool. Based on the building topology, the automation studio generates a navigation structure of the building to allow access to different areas of the building and generates automatically web pages with a view of the building visualization by using the web templates. The automation studio is connected with a visualization server to transfer the web pages to the visualization server as a visualization runtime and the web pages are forwarded to a client device.

It is provide to split the visualization in:
a visualization database site (or building)
a visualization server
a visualization engine (or visualization runtime)

The visualization site database is the database containing all the information to display the site in the visualization and is located on the visualization server.

The visualization server is the web server application that answers the web request and sends back the web page to the client web browser, with:
   a visualization engine script
   a part of the visualization database necessary to generate the page (e.g. position of the different graphical elements, their animation, their actions—write/click etc.)

The visualization engine or the visualization runtime is a script executed on client side that is able to interpret the visualization site database and renders it on client side.

The data processing of the configuration data, the data transfer to the automation studio, to the visualization server and/or to the client device done by internet connections. In addition, the transfer of the generated pages can use internet connections.

Furthermore, the automation studio contains a library of visual elements (e.g. text boxes, checkboxes, gauges, chart pies, trend displays, alarm displays, image animations, etc.), which allow changing values on fieldbus level and create at least on functionality to a control element and/or a group the control elements on the right page view of the building visualization.

The new element of the invention is that the visualization is generated from templates so configurations are only defined once at template level and these configurations are applied to as many instances define on site to generate the visualization site.

In an advantageous embodiment, the automation studio provides at least one interface to input additional configuration data. These data are combined with the data, providing of the fieldbus commissioning tool, which are used to generate automatically the pages views.

Advantageous, by the available configuration data is used in two ways. The first one is the commissioning of the physical devices. This working step is quite common and well known. However reusing the available information for semi-automatic generating of a building visualization is new and has many advantages. The speed of the visualization generation is increased. It is possible to configure from one template a site with thousands of instances.

Furthermore, it is easier to perform the maintenance of the system, because an error done at template level needs to be repaired only at template level not at each instance. In addition, the development costs of the system for generating a building or a home visualization are reduced.

According to a further aspect, the invention refers to a new web-based method to generate a building visualization. The generation of the building visualization uses the knowledge of different parts of the building, e.g. devices, device objects, zones and the functionality of those building parts. At least one of the parts is generated automatically.

The new web-based method for generating the building or home visualization comprises the steps of
   implementing physical devices of a building in a fieldbus commissioning tool, by using a template library and a graphical commissioning engine,
   receiving building topology information delivered by the fieldbus commissioning tool to an automation studio,
   based on the building topology, generating a navigation structure of the building to allow access to different areas of the building and generating automatically at least one web page with a view of the building visualization by the automation studio by the automation studio,
   transferring the web pages to a visualization server, and providing the web pages to a client device.

The commissioning tool is used to:
   to define fieldbus templates (devices/devices objects/zones),
   to define the localization of the different instances of devices, devices objects and zones,
   to commission the fieldbus,
and this gives a "Site database".

Once this is done, the automation Studio comes on top of this to add the following extra template data:
   automation template,
   web template Once these templates are defined, the automation studio goes through the "Site database" and the automation studio applies the automation templates and web templates to each instance of device, devices objects and zone and from there generate the automation parts (e.g. alarms, trends, schedulers) and the web pages (e.g. for the alarms, trends, schedulers).

In the exemplary embodiment of the invention, the innovative system comprises a fieldbus commissioning tool 10 with a template library 12 and a graphical commissioning engine 11. The fieldbus commissioning tool 10 provides at least one user interface for input configuration data 13. The template library 12 includes a set of device templates, devices objects templates, zone templates, automation templates, web templates.

The device template and the devices object templates contain information how the devices are used for a dedicated use, for example switching/dimming on light, change the set points of parameters, (e.g. temperature), presence detections, moving or controlling of blinds.

The zone template specifies which functionalities are available within a zone, for example zones for air conditioning, lighting and/or blinds. A zone is a collection of device objects, links, rules and parameter sets and is associated with a physical room, e.g. an office but this is not essential.

Advantageous, by all devices of the building automation system are assigned logically to their appropriate counterpart (e.g. sensor—actuator assignment) and the complete building topology including numbers of zones, their localization within the building topology and the available functionalities will be generated.

The fieldbus commissioning tool 10 is connected with a configuration data input unit 13 and an automation studio 20. The automation studio 20 receives all available information containing building topology from the fieldbus commissioning tool 10, e.g. zones, functionalities and devices.

Based on the building topology, the automation studio 20 generates a navigation structure of the building to access different areas of the building. The navigation structure comprises the structure of parts, floors, rooms, areas and/or spaces of the building.

The building visualization comprises at least one page view, which is generated by the automation studio 20. With the knowledge of the zones, the automation studio 20 sets up and names the appropriate number of page views within the building visualization.

The automation studio 20 provides an internal engine, which process all information, which are delivered by the fieldbus commissioning tool 10 and the interface to input additional configuration data 22, to generate semi-automatically a building visualization.

Advantageous, by the internal engine of the automation studio 20 is able to process all information of the site database and the automation templates and the web templates and to generate semi-automatically the building visualization. The building visualization comprises at least one page view, which is generated by the automation studio 20.

As additional resource the automation studio 20 contains a predefined library of visual elements 21, e.g. controls, which allow changing values on fieldbus level (e.g. switch light on/off). Based on the information of the functionalities and the resources provided by the library of visual elements 21, the automation studio 20 assign/create a functionality to an appropriate control element and group the control elements on the right page view of the building visualization.

The automation studio 20 provides an interface for an additional configuration data input 22, because the fieldbus commissioning tool 10 requires not all information are needed.

This interface 22 is used to feed additional configuration data, e.g. schedulers, trends and/or user levels into the automation studio. These configuration data are finally processed/combined with the data, providing of the fieldbus commissioning tool 10 and are used to generate automatically the pages views. These page views are transferred to a visualization server 31 as a visualization runtime.

Advantageous, by at least one of the following parts is generated automatically:

Based on the building topology and zones the automation studio 20 generates the navigation structure to access different areas of the building via the building visualization.

With the knowledge of the zones the automation studio 20 sets up and names the appropriate number of page views within the building visualization.

With the information of the usage and the resource visual elements library 21 the automation studio 20 can assign a usage to an appropriate control element and group the control elements on the right page view.

With the information of the usages and the resource visual elements library 21 the automation studio 20 can assign a usage to an appropriate control element and group the control elements on the right page view.

The described semi-automatic generation of the building automation in a user interface, e.g. a Human-Machine Interface (HMI) for a building management system or building automation system is integrated into a graphical engineering workflow and uses visualization templates to display an alarm management, a scheduling management and/or a trend/historian management.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE LIST

10 fieldbus commissioning tool
11 graphical commissioning engine
12 template library
13 configuration data input unit
20 automation studio
21 library of visual elements
22 interface to feed/input additional configuration data into the automation studio
31 visualization server
32 client device

What is claimed is:

1. A system for generating a visualization of a building or home, comprising:
   a configuration data input unit configured to receive configuration data;
   a fieldbus commissioning tool connected with the configuration data input unit, the fieldbus commissioning tool including a template library and a graphical commissioning engine and being configured, based on the configuration data, to both commission physical devices of the building or home and to generate building topology information, the template library including:
      a set of device templates and device object templates, which contain information on how the physical devices are used;
      a set of zone templates, which specify use of the physical devices available within a zone of the building or home; and
      a set of automation templates and a set of web templates,
   an automation studio connected with the fieldbus commissioning tool, the automation studio being configured to receive the building topology information and to generate, based on the building topology information, a navigation structure of the building or home to allow access to different areas of the building or home, and to automatically generate, using the web templates, web pages with a view of the visualization; and
   a visualization server connected with the automation studio and configured to receive the web pages, and then provide the web pages to, or make the web pages accessible on, a client device,
   wherein the device templates, device object templates, and zone templates are generated by the commissioning of the physical devices, and the automation templates and web templates are generated by the automation studio.

2. The system according to claim 1, wherein the graphical commissioning engine is configured to localize devices, functionalities, and zones on a graphical building map and to generate automatically information needed for the implementation of building visualizations, using the set of device templates, automation templates, web templates, and/or zone templates, on at least one user interface for a building management system or building automation system.

3. The system according to claim 1, wherein the automation studio contains a library of visual elements which are configured to allow changing values on a fieldbus level and to create at least one functionality for a control element and/or a group, the control elements being on a page view of the building visualization.

4. The system according to claim 1, wherein the automation studio is configured to provide at least one interface for an input of additional configuration data, the additional configuration data being combined with data from the configuration data input unit provided to the fieldbus commissioning tool, so as to generate automatically page views of the building visualization.

5. The system according to claim 4, wherein the additional configuration data comprise schedulers, trends, and/or user levels.

6. The system according to claim 4, wherein the page views are transferred to the visualization server.

7. The system according to claim 1, wherein the zone templates are configured to localize zones for air conditioning, lighting, and/or blinds, and a zone comprises a collection of device objects, links, rules, and/or parameters of the zone on a graphical building map.

8. The system according to claim 1, wherein the device templates are configured to switch/dim light, change set points of parameters, present detections, control lighting, and/or move blinds.

9. The system according to claim 1, wherein the building topology information comprises information concerning zones, control components, devices, device objects, networks, areas, spaces, equipment, and/or their functionalities, used in a building management system or building automation system.

10. The system according to claim 1, wherein the navigation structure comprises a structure of parts, floors, rooms, areas, and/or spaces of the building or home.

11. A user interface for the visualization of an automation in the building or home, as a building management system or building automation system, according to claim 1.

12. A web-based method for generating a building or home visualization, comprising:

receiving configuration data at a configuration data input unit;

commissioning physical devices of the building or home in a fieldbus commissioning tool using the configuration data, the fieldbus commissioning tool including a template library and a graphical commissioning engine;

generating building topology information using the fieldbus commissioning tool based on the configuration data;

receiving, at an automation studio, the building topology information;

based on the building topology information, generating a navigation structure of the building or home to allow access to different areas of the building or home and generating automatically, using the automation studio, at least one web page with a view of the building or home visualization;

transferring the at least one web page to a visualization server; and providing the at least one web page to a client device using the visualization server, wherein the template library includes:

a set of device templates and device object templates, which contain information on how the physical devices are used;

a set of zone templates, which specify use of the physical devices available within a zone of the building or home; and a set of automation templates and a set of web templates, and wherein the device templates, device object templates, and zone templates are generated by the commissioning of the physical devices, and the automation templates and web templates are generated by the automation studio.

* * * * *